(12) United States Patent
Stiller et al.

(10) Patent No.: US 6,347,671 B1
(45) Date of Patent: Feb. 19, 2002

(54) MULTI-PURPOSE OPERATING UNIT ATTACHMENT SYSTEM

(75) Inventors: Daniel G. Stiller, Savage; Kris Lindstrom, Cottage Grove, both of MN (US); Wolfgang Oehler, Wipperfurth (DE); Eckhard Hauer, Gummersbach (DE); Pedro Dutsch, Engelskirchen (DE)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/308,878

(22) PCT Filed: Aug. 28, 1998

(86) PCT No.: PCT/US98/17853

§ 371 Date: Nov. 24, 1999

§ 102(e) Date: Nov. 24, 1999

(87) PCT Pub. No.: WO99/09806

PCT Pub. Date: Mar. 4, 1999

Related U.S. Application Data (60) Provisional application No. 60/057,246, filed on Aug. 29, 1997.

(51) Int. Cl.[7] .............................. B60D 1/00; A01D 75/30
(52) U.S. Cl. ........................................ 172/439; 172/272
(58) Field of Search ........................ 56/6, 7, 13.6, 14.4, 56/228, 226, 249; 172/439, 683, 445, 753, 272, 830, 47

(56) References Cited

U.S. PATENT DOCUMENTS

| | | | |
|---|---|---|---|
| 2,743,117 A | * 4/1956 | Hutchings | 280/456 |
| 5,193,623 A | * 3/1993 | Burette | 172/47 |
| 5,743,339 A | * 4/1998 | Alexander, III | 172/272 |
| 5,950,735 A | * 9/1999 | Godbersen | 172/439 |

* cited by examiner

Primary Examiner—Robert E. Pezzuto
(74) Attorney, Agent, or Firm—James W. Miller (57) ABSTRACT

A multi-purpose turf machine (100) used primarily as a triplex turf mower includes a system for attaching an "operating unit" (e.g., a turf cutting unit) to a traction vehicle (102); and for moving the operating units, e.g., a pair of front cutting units (108a), between a working position and a transport position, the system utilizing a single actuator (224) to provide both vertical lifting as well as "wing-like" pivoting motion. The attachment system includes a female A-frame member (132) attached to the front cutting units (108a) and a mating male A-frame member (202) movably connected to the frame (101) of the vehicle (102). The machine (100) additionally includes a belt drive system to power the cutting units (108). The belt drive system provides correct belt tension between a driving pulley (230, 236) located on the vehicle (102) and a driven pulley (124) located on the end of each cutting unit (108) when the cutting units are in the working position. The drive system can additionally accommodate the wing-like pivoting motion of the front cutting units (108a) as they are moved from the working position to the transport position and back again. Finally, a preferred attachment system is highly versatile and easily permits removal and installation of a wide variety of operating units, e.g., cutting units, brooms, blowers, dump carts and dozer blades.

25 Claims, 9 Drawing Sheets

MULTI-PURPOSE OPERATING UNIT ATTACHMENT SYSTEM

This application is a continuation in part of provisional application Ser. No. 60/057,246, filed Aug. 29, 1997.

TECHNICAL FIELD

This invention relates generally to turf maintenance equipment, and ore particularly to an improved system for attaching an "operating unit" (e.g., a cutting reel) to a traction vehicle.

BACKGROUND OF THE INVENTION

Although the present invention can be applied to a wide variety of turf maintenance equipment, it is particularly well suited for use with multi-purpose turf maintenance machines used primarily as power turf mowers. Although many types of power turf mowers are known, such equipment may generally be classified according to the type of cutting unit it employs. A rotary cutting unit usually includes one or more rigid, generally straight, steel blades rotated within a housing ("deck") about a vertical axis to strike and sever the grass or other vegetation at a predetermined height above the ground. A reel cutting unit, on the other hand, typically includes a reel having several curved blades rotated about a horizontal axis. The curved blades of the reel work in conjunction with a fixed blade, or "bedknife," to shear the grass in a scissorslike manner.

While rotary cutting units are suitable for many purposes, it is generally perceived that reel cutting units provide a higher quality cut. The present invention relates primarily though not exclusively to reel-type turf mowers, and the remainder of the discussion will focus accordingly.

Power turf mowing equipment may also be categorized based on the method used to propel the cutting units. Generally, there are walk-behind, riding, and towed turf mowers. The present invention relates primarily to riding turf mowers and, more specifically, those riding turf mowers with three reel-type cutting units, generally referred to as "triplex mowers."

Triplex mowers typically include a traction vehicle supported by a plurality of wheels, including one or more traction (i.e., powered) wheels; a prime mover supported by the vehicle frame and connected through a transmission to the traction wheel(s); and three cutting units powered by the prime mover, two cutting units mounted generally ahead of the front wheel(s) and laterally offset about the longitudinal or fore-and-aft axis of the traction vehicle, and one cutting unit mounted generally between the front and rear wheels and laterally centered between the front cutting units. Typically, the two forward cutting units of a triplex mower, being laterally and symmetrically offset, leave an uncut section therebetween during operation. Being centered between the front cutting units, the rear cutting unit then spans the uncut section and overlaps the mowed path of both forward cutting units. Consistent mowing across the full span of the mower is thus obtained.

Triplex mowers further include a system designed to attach the cutting units to the vehicle. In addition to securing the cutting units to the traction vehicle, the attachment system also permits lifting of the cutting units from their lowered, working position to their raised, transport position. In the working position, the attachment system preferably permits the cutting units to "float" relative to the traction vehicle. That is, the cutting units are independently and separately supported so that they can follow the contours and undulations of the ground irrespective of the motion of the traction vehicle. In the transport position, the front cutting units are typically raised such that the outer ends are pivoted upwardly (and sometimes inwardly) to reduce the overall width of the mower (the rear cutting unit is typically lifted only vertically). In this configuration, the mower is more easily maneuvered between obstacles; e.g., trees and fences. Movement of the front cutting units between the working and transport positions is often accomplished through simple pivotal motion. That is, each front cutting unit pivots about a horizontal or "wing" axis which is parallel to the vehicle longitudinal axis and near the inboard end of the cutting unit. By properly locating the wing axis, the preferred range of motion (i.e., movement between working and transport positions) is obtained.

In addition to mechanically securing the implement or "operating unit" to the traction vehicle, the attachment system preferably provides drive power to the implement. Two different types of drive systems are commonly utilized with triplex mowers. The first implement drive system uses a hydraulic motor to drive each independent reel. The hydraulic motor is usually mounted to one of the reel ends and connected by a series of flexible hoses to a pump located on the traction vehicle frame. This drive system is advantageous in that the flexible hose attachment can easily accommodate the range of cutting unit motion required during operation and during movement between the working and transport positions. However, providing separate hydraulic motors for each reel is costly. For this reason, some triplex mowers utilize a belt drive system. Belt drive systems employ a driven pulley located on each reel that is connected by a flexible drive belt to a driving pulley located on the traction vehicle. While more economical, belt drive systems require an attachment system that provides the necessary belt tension when the cutting units are in the working position yet does not interfere with movement of the cutting units during operation (i.e., floating) or during movement to the transport position. The present invention is primarily, though not exclusively, directed to a triplex mower having a belt drive system for supplying power to the cutting reels.

While the attachment system of the present invention could be used with a dedicated, single-purpose turf mower, it is preferably used in conjunction with a multi-purpose turf machine. Such multi-purpose turf machines, by definition, must accommodate other implements or "operating units" (e.g., blowers, rotary brooms, snow throwers and dozer blades) in addition to reel cutting units. Some of these other implements or "operating units" generally require the ability to be either vertically lifted or "pitched" (about a transverse horizontal axis running generally perpendicular to the vehicle's fore-and-aft longitudinal centerline) rather than pivoted about a longitudinal horizontal axis, or "wing axis." For example, in order to effectively transport a snow thrower or dozer blade, it must be vertically elevated from its working position, rather than pivoted about a "wing axis" as reel cutting units typically require. It is therefore beneficial for an attachment system of a multipurpose turf machine to include the capability to either lift (or pitch) a given implement, or pivot it about a wing axis, or both.

Many different types of attachment systems that provide this dual motion (i.e., lift or pitching motion on the one hand, and a "wing" type motion on the other hand) have been tried over the years. With many attachment systems, one actuating device (e.g., hydraulic cylinder) is used to provide the lifting or pitching motion, while another actuating device is used to provide the wing type motion. While such attachment systems have proven to be adequate, the use of multiple actuating devices can add considerable cost and complexity to the mower. Thus, an attachment system that can accomplish the desired operating unit motion more economically and with less complexity is highly desirable. Ideally, the attachment system can provide this dual motion with only one actuating device (e.g., hydraulic cylinder).

Another preferred feature of an operating unit attachment system is the ability to permit implements to be quickly and easily attached and removed from the traction vehicle. Failure of the attachment system to permit easy attachment significantly reduces versatility of the machine. Although such quick-attach systems are known, many are generally perceived to sacrifice quality of cut (when turf cutting units are installed) in favor of ease of attachment.

Thus, there are several challenges associated with attaching an operating unit (e.g., a reel type cutting unit) to a multi-purpose turf maintenance vehicle. The challenges include ease of attachment, simplicity of actuation, and a reasonable cost for the drive system. The operating unit attachment system of the present invention meets these challenges.

SUMMARY OF THE INVENTION

The present invention is directed to an attachment system for securing an implement or "operating unit" (e.g., a reel type turf cutting unit) to a traction vehicle. The attachment system connects the operating unit to the traction vehicle, powers the implement (if power is required for the implement), and facilitates optimum movement of the operating unit from a working position to a transport position relative to the traction vehicle; and the attachment system preferably includes a male member; a female member substantially congruent to the male member, wherein the male member interlocks with the female member, thereby interconnecting the operating unit to the traction vehicle; means for vertically raising the interconnected members and the operating unit; and means for pivoting the operating unit relative to the traction vehicle as the operating unit is raised from its working position to its transport position.

In a preferred embodiment, the attachment system includes an upwardly converging male member operatively connected to the traction vehicle, and an upwardly converging female member operatively connected to the operating unit. And, in a most preferred embodiment, the male and female members are A-shaped, in particular "A-frame" assemblies.

Another aspect of the invention is that there is preferably a first device for vertically raising the interconnected male and female members (whether A-shaped or otherwise) and the operating unit; and a second device for pivoting the operating unit relative to the traction vehicle as the operating unit is raised, wherein the pivoting device includes a first contact member operatively connected to the operating unit and a second contact member operatively connected to the traction vehicle, whereby interaction between the first and second contact members causes the operating unit to simultaneously pivot as it is raised from its working position to its transport position.

Another aspect of a preferred attachment system relates to providing power to the implement or operating unit. In a preferred embodiment the traction vehicle prime mover powers at least one auxiliary driving pulley, and the driving pulley is operatively connected to one or more driven pulleys on the operating unit(s) by one or more drive belts; and included is a device for providing proper belt tension between the driving pulley(s) and the driven pulley(s) when the operating unit is in the working position. The belt tensioning means can include a tension arm pivotally connected to the traction vehicle; an adjustable tie rod having a forward end operatively connected to the cutting unit and a rearward end operatively connected to the tension arm; and a rubber bumper attached to the traction vehicle frame, whereby the rubber bumper forwardly biases the tie rod when the cutting unit is in the working position such that proper belt tension is applied when the cutting unit is in the working position.

Another embodiment of the invention is an attachment system for at least one reel cutting unit; and a cutting unit lift arm for each cutting unit having an outboard end pivotally attached to the cutting unit at an outer pivot, an inboard end, and a center pivot located between the inboard and outboard ends near the inboard end, wherein the center pivot provides pivotal attachment of the lift arm to the female A-frame member, and wherein a "kicker roller" is mounted on the inboard end of the lift arm. The "kicker roller" interacts with a "stationary roller" mounted on the vehicle frame to cause the cutting unit(s) to pivot in "wing-like" fashion as each cutting unit is moved from its working position to its transport position.

Another aspect of the invention relates to how the operating unit is moved from its working to its transport position. Preferably, the attachment system includes a hydraulic cylinder having a first end pivotally attached to the traction vehicle and a second end pivotally attached to the male A-frame member, wherein the cylinder downwardly displaces the interconnected A-frame members when the cutting unit is in the working position and upwardly displaces the A-frame members when the cutting unit is in the transport position; and the rollers discussed above can interact to cause the operating unit to undergo sophisticated movements as A-frame members are being moved about by the hydraulic cylinder. Thus, potentially a single hydraulic cylinder is the only "active element" required to handle all of the implement moving tasks.

Finally, the "operating unit" referred to throughout this discussion can be any grounds maintenance implement, e.g., a reel type cutting unit, rotary broom, debris blower, dozer blade, or even a dump cart.

BRIEF DESCRIPTION OF THE DRAWING

The invention will be further described with reference to the Drawing, wherein.

DETAILED DESCRIPTION OF THE INVENTION

Figure 1:
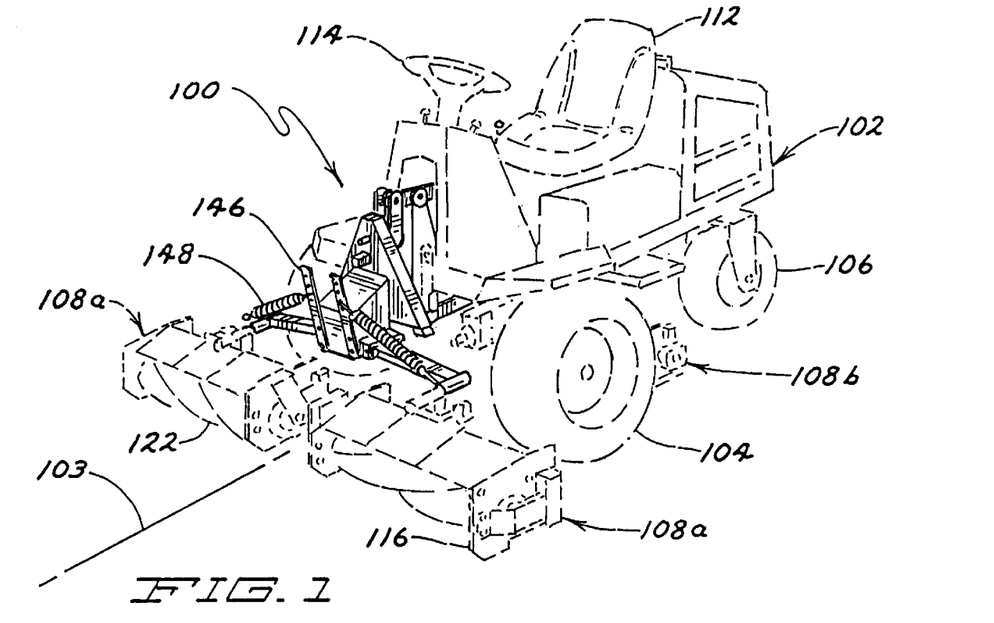
FIG. 1 is a left front perspective view of an operating unit attachment system according to the present invention.

Referring to the Drawing, wherein like reference numerals designate like parts and assemblies throughout the several views, FIG. 1 shows a perspective view of a preferred turf maintenance machine 100 according to the invention. Machine 100 is a reel-type turf mower generally of the type represented by the Grounds Pro™ 2000 triplex reel mower sold by The Toro Company, assignee herein, but those skilled in the art will appreciate that the present invention could be applied to other types of turf maintenance equipment. Mower 100 includes a traction vehicle 102 having a frame 101 (best shown in FIG. 2) supported by a pair of front drive wheels 104 appropriately coupled through a transmission (not shown) to a prime mover (also not shown). A rear steerable wheel 106, which may or may not be powered, supports the rearward end of vehicle 102.

Turf maintenance machine 100 is, in its most preferred form, a high precision yet versatile riding mower for use on sports fields. In the embodiment as shown in FIG. 1, there are two front cutting units 108a spaced along a line generally perpendicular to a fore-and-aft or longitudinal axis 103 of mower 100 and directly in front of drive wheels 104; and a single rear cutting unit 108b roughly centered between front vehicle wheels 104 and also arranged along a line which is generally perpendicular to the longitudinal axis 103 of the mower. As understood by those skilled in the art, rear cutting unit 108b is centered between and overlaps the front cutting units 108a to handle the uncut strip of grass left therebetween.

Although the implement attachment system of the present invention focuses primarily on front cutting units 108a rather than rear cutting unit 108b, it is worthwhile to note that both front and rear cutting units 108 are preferably nearly identical in all pertinent respects. However, the "a" and "b" suffixes will often be used where appropriate to clarify the invention. Further, in the preferred embodiment, the two front cutting units 108a and all related support structure are identical mirror images of one another. Accordingly, Applicants often make reference to parts and assemblies in the singular when, in fact, identical parts and assemblies exist on both left and right sides.

In the embodiment of mower 100 shown in FIG. 1, an operator sits in a seat 112 and steers the traction vehicle 102 by means of a steering wheel 114 which can be manipulated to cause rear wheel 106 to pivot about a vertical axis, thereby steering the vehicle. Various levers and pedals permit the operator to control the engine speed, cutting units (on/off, raise/lower), brakes, etc. The prime mover powers one or more hydraulic pumps which provide(s) hydraulic fluid to the wheel motors and the cutting unit drive system, under control of various operator-controlled valves.

Figure 7:
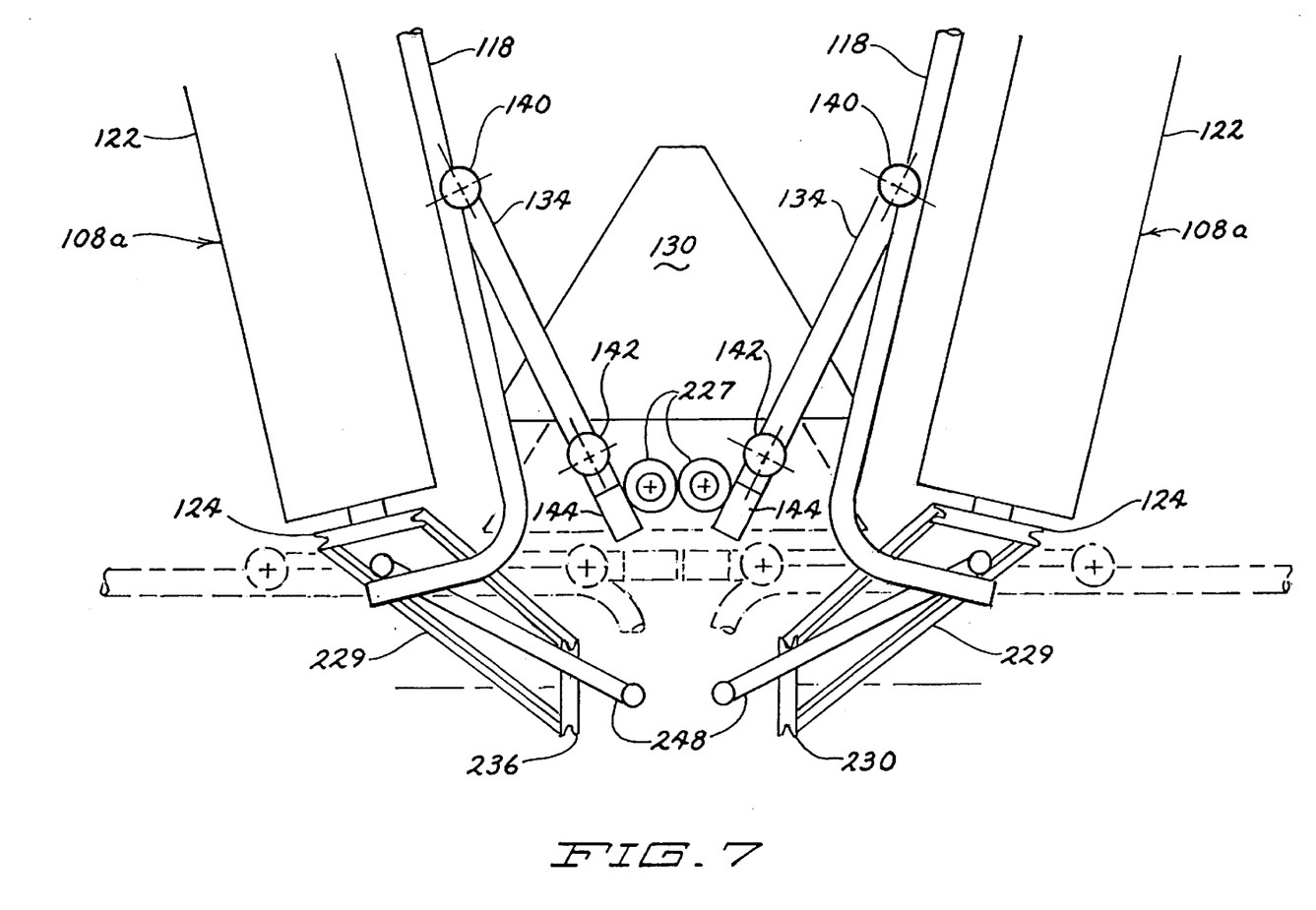
FIG. 7 is a front elevational view of the attachment system of FIG. 1 with the cutting units in the transport position.
Figure 8:
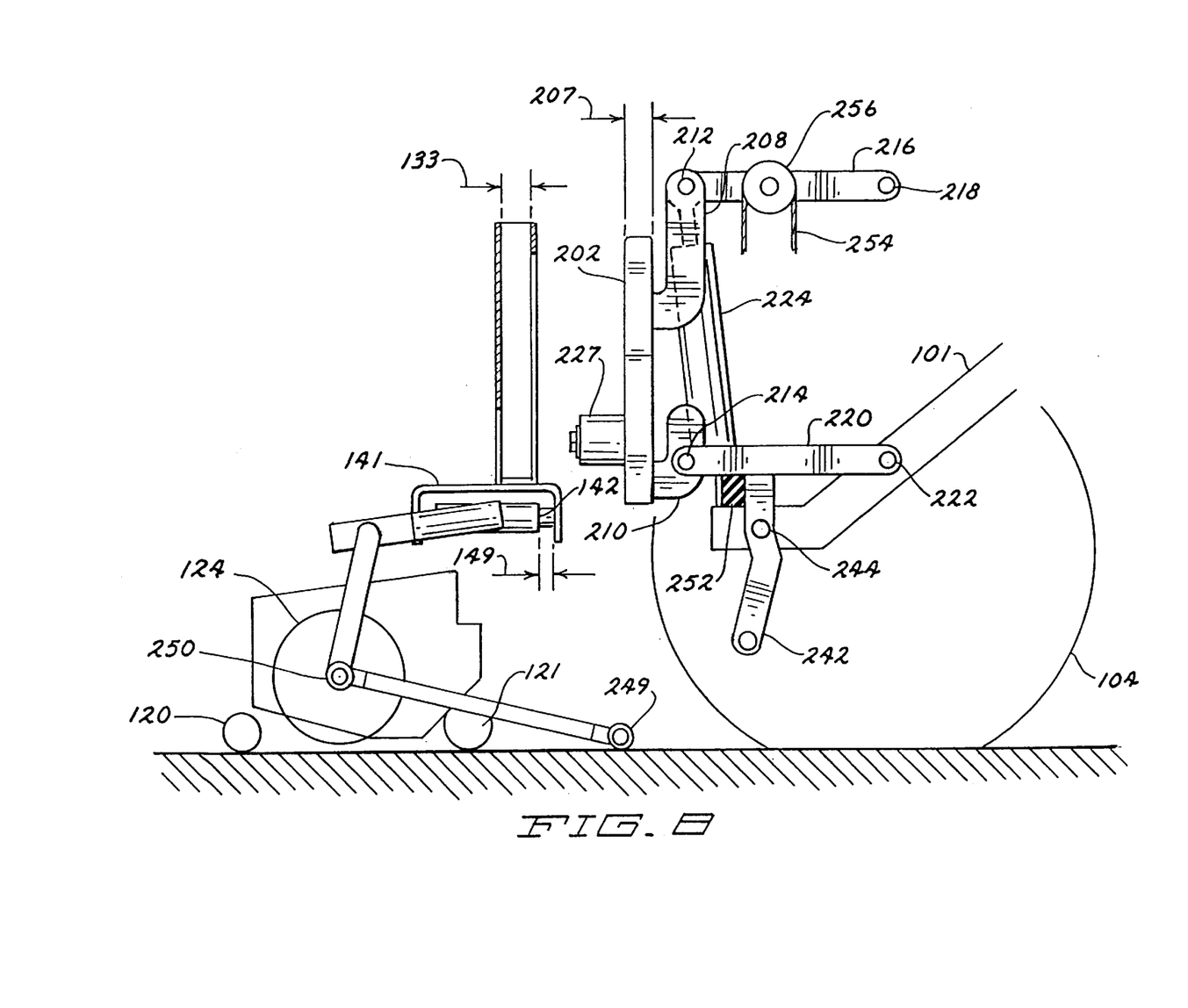
FIG. 8 is a left side elevational view of the attachment system of FIG. 1 showing the belt tensioning mechanism of the implement drive system, with the cutting unit detached.

Although the particular construction of reel units 108 is, for the most part, not central to the invention, the basic components will be described. Referring particularly to FIGS. 1, 7 and 8, a pair of generally rectangular side plates 116 are located at opposite ends of each reel unit 108. Plates 116 are spanned at the top by a steel cross tube 118 (best viewed in FIG. 7) and at the bottom by a rear roller 121 and a front roller 120. The front roller can be a so-called "wiehle" roller, having a series of circumferential grooves across its entire width. Also spanning side plates 116 is a horizontally centrally mounted rotatable reel 122. A driven pulley 124, as shown in FIG. 7, is coupled to reel 122 to provide power thereto. The standing grass blades are sheared off toward the bottom of the reel, at a stationary bedknife (not shown).

Cutting units 108 may also include several shields (not shown) which help confine and direct the grass clippings. These shields are generally concentric to and offset from cutting reel 122.

Figure 2:
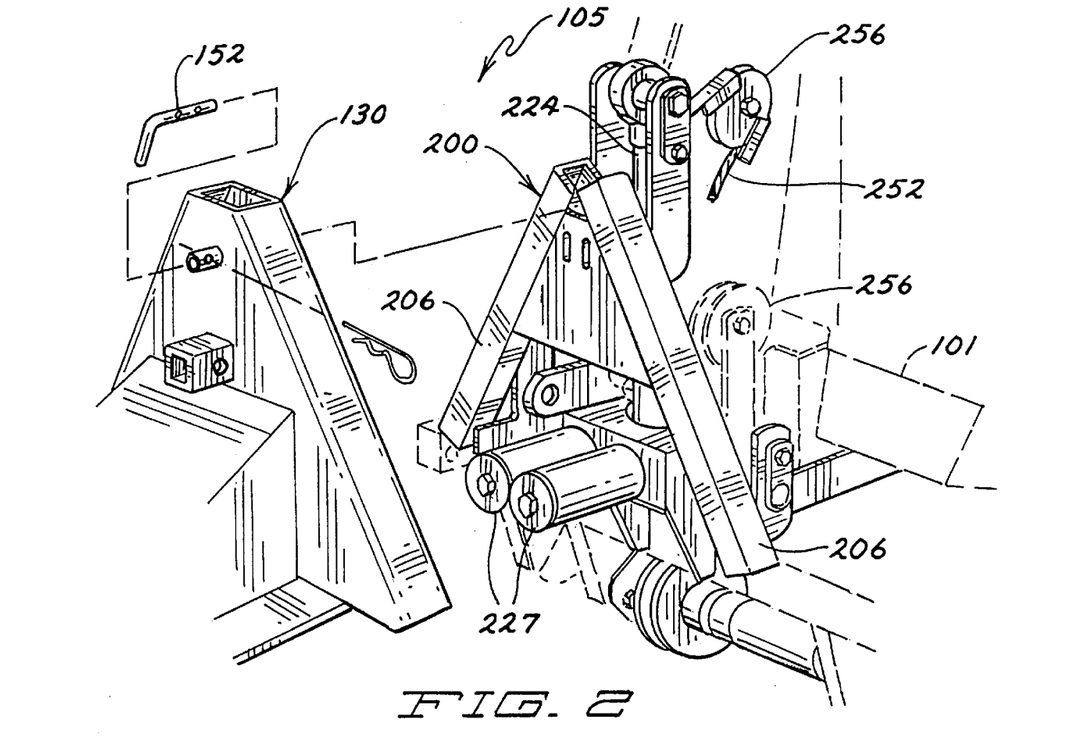
FIG. 2 is enlarged perspective view of the attachment system of FIG. 1 with portions of the attachment system removed for the sake of clarity.

Having described the traction vehicle and cutting units, attention will now be directed to a system 105 used to attach front cutting units 108a to traction vehicle 102. In the preferred embodiment as shown in FIG. 2, the attachment system 105 comprises a male A-frame assembly 200 movably attached to vehicle 102 and a female A-frame assembly 130 which carries front cutting units 108a. Additionally, the preferred attachment system 105 includes a drive system 107 best viewed in FIGS. 5, 6, 7 and 9. Each of these major components or assemblies is discussed separately below.

FEMALE A-FRAME ASSEMBLY 130

Figure 4:
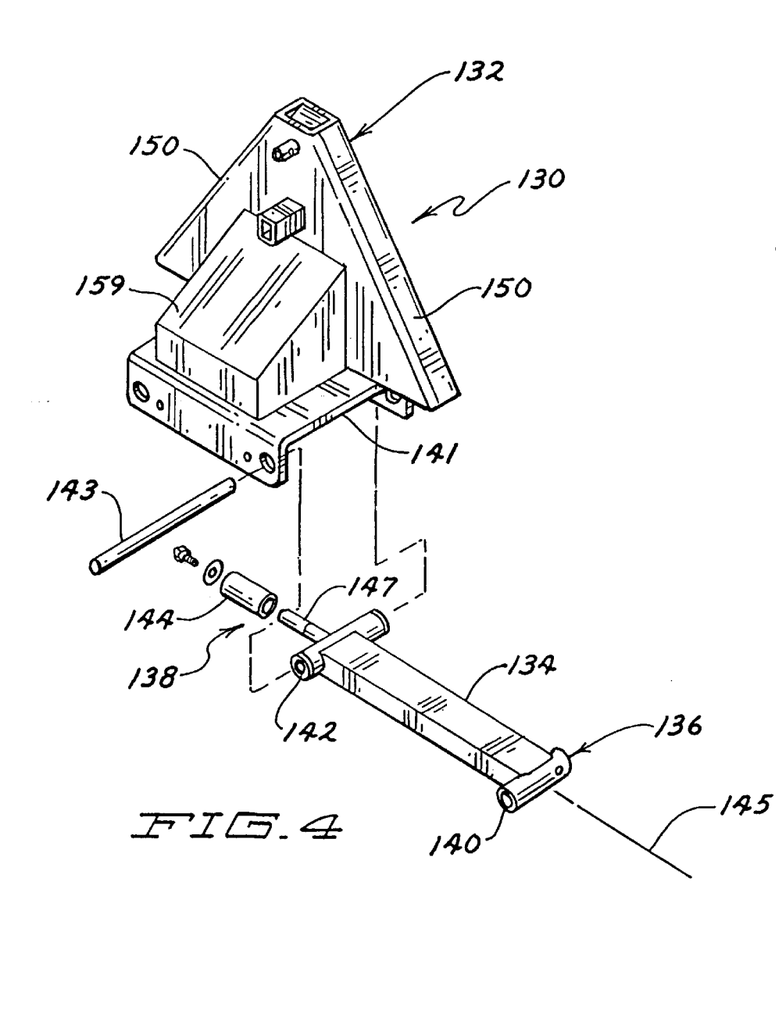
FIG. 4 is an exploded view of another major portion of the attachment system of FIG. 1, the female A-frame assembly, taken from the front.

Referring now to FIG. 4, which depicts female A-frame assembly 130, a female A-frame member 132 is centrally located between cutting units 108a (not shown) and pivotally connected therebetween by a pair of lift arms 134 (one per cutting unit). Lift arm 134 is a substantially straight member extending outwardly and transversely from female A-frame member 132. Lift arm 134 has an outboard end 136 and an inboard end 138. Outboard end 136 preferably includes a cylindrical tube 140 having an axis that is both substantially perpendicular to a longitudinal axis 145 running through lift arm 134 and generally parallel to the vehicle longitudinal axis 103. Outboard tube 140 pivotally attaches to cross tube 118 of cutting unit 108a (cutting unit 108a is omitted from FIG. 4 for clarity but is shown in FIG. 7).

At the inboard end 138 of lift arm 134 is an inboard cylindrical tube 142. Tube 142 connects each lift arm 134 to female A-frame member 132 and preferably permits wing type pivotal motion about an axis substantially parallel to the axis of outboard cylindrical element 140. Tubes 140 and 142 establish pivots that permit pivotal movement through the use of conventional bushings and bearings. Inboard tube 142 mounts within a clevis 141 in female A-frame member 132 as shown in FIGS. 4 and 8. More specifically, inboard tube 142 is carried by a rod 143 that spans clevis 141. In the preferred embodiment, a small gap 149, best viewed in FIG. 8, exists between inboard tube 142 and clevis 141. The ability to freely pivot about the pivot joints formed by tubes 140 and 142 ensures that cutting units 108a maintain optimal ground contact across their entire width regardless of lateral variations in turf elevation.

Referring still to FIG. 4, further details of inboard end 138 of lift arm 134 will now be described. In the preferred embodiment, lift arm 134 is constructed of rectangular steel stock extending between tubular elements 140 and 142. Inboard of tubular element 142 is a rod 147 upon which freely rotates a short tubular "kicker roller" 144, further described below. The purpose of the assembly consisting of rod 147 and kicker roller 144 is described below. In the preferred embodiment, rod 147 has a longitudinal axis substantially coaxial with longitudinal axis 145 of lift arm 134. In another embodiment (not shown), the longitudinal axis of inboard rod 147 could be angled relative to axis 145 of lift arm 134 (although both axes would typically remain coplanar) in order to accommodate alternative reel cutting units. In either embodiment, kicker roller 144 is rotatably and coaxially mounted on rod 147 such that kicker roller 144 is free to rotate thereabout. In the preferred embodiment, kicker roller 144 is constructed of hardened steel and is approximately 1.5 inch in diameter. The purpose of kicker roller 144 is described below.

In addition to supporting lift arms 134, female A-frame member 132 includes a pair of adjustable tension members 146 and a pair of tension springs 148 best viewed in FIG. 1. With one end attached to cutting unit 108a and the other end adjustably attached to tension member 146, each spring 148 adjustably counterbalances the weight of the associated cutting unit 108a. By adjusting the spring tension and thus the amount of counterbalance force provided by spring 148, and thus the downward force applied by the cutting units, ground following and quality of cut may be optimized for a variety of turf conditions.

Figure 4A:
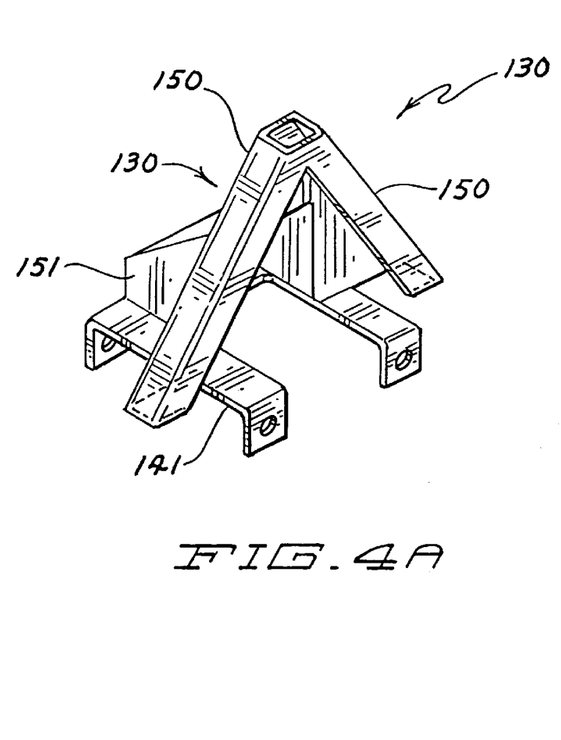
FIG. 4A is an exploded view of the female A-frame assembly taken from the rear.

As evidenced in both FIGS. 4 and 4A, female A-frame assembly 130 includes the vertically oriented A-shaped member 132; the horizontally oriented rectangular and downwardly opening clevis 141; and a trapezoidal brace member 151 that has a vertical surface welded to the vertical A shaped member 132, and a horizontal surface welded to the horizontal clevis 141. A-shaped member 132 is formed by two, upwardly converging C-shaped channels 150 welded to form the "A" shape. Each channel 150 has a hollow interior and three closed sides (i.e., the "underside" of each channel 150 is open). Referring to FIG. 8, channel 150 has an interior depth 133 designed to accommodate a mating male A-frame member 202 as described below.

While the preferred embodiment utilizes the mating A-frame configuration as described within, Applicants perceive that other shapes could be used and still fall within the scope of the invention. For example, the A-frame could be truncated (i.e., channels 150 could terminate before reaching the A-frame peak or apex). Or, each A-frame member could be rectangular, for example, and not A-shaped at all. It is even perceived that the A-frames (or any of the other alternatives listed above) could be inverted (i.e., like a "V"-frame in the case of "V" shaped mating elements) and still function in a similar manner. However, inverting the mating members would also require reversing the location of the male member relative to the female member. For example, the female V-frame member would then be mounted to the traction vehicle while the male V-frame member would attach to the operating unit. While Applicants believe these alternative embodiments are encompassed within the scope of the present invention, it is perceived that the mating A-frame configuration described herein is a preferred embodiment.

MALE A-FRAME ASSEMBLY 200

Figure 3:
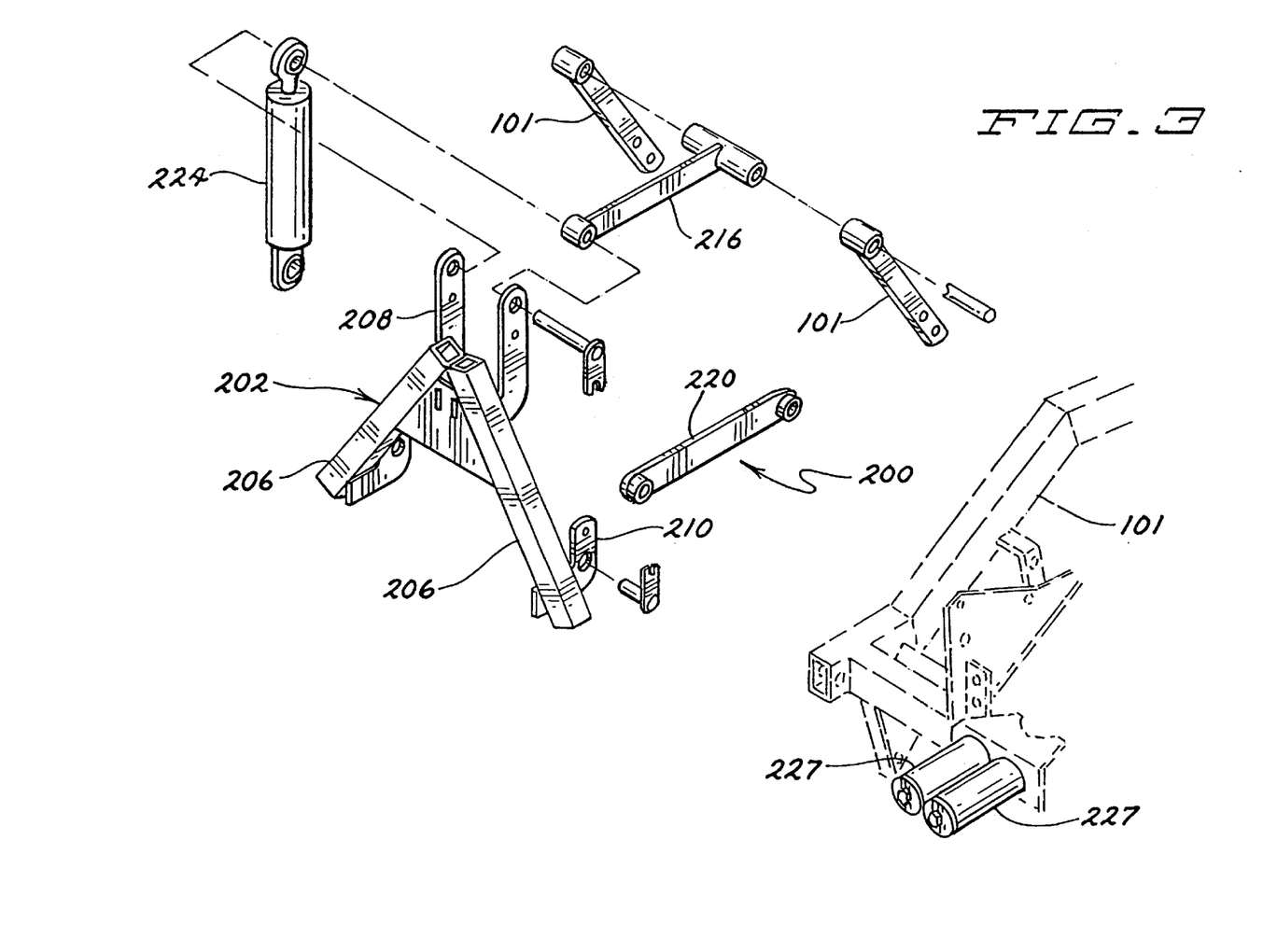
FIG. 3 is an exploded view of one major portion of the attachment system of FIG. 1, the male A-frame assembly.

Traction vehicle 102 carries male A-frame assembly 200 which is best viewed in FIGS. 2 and 3. In the preferred embodiment, male A-frame assembly 200 comprises the male A-frame member 202 operatively connected to vehicle frame 101. Like female A-frame member 132, male A-frame member 202 is formed by two, upwardly converging tubes or "legs" 206 welded together to form the A-frame shape. However, instead of a C-shaped cross-section, tubes 206 are preferably constructed of rectangular steel tubing. As best viewed in FIG. 8, each tube 206 has an external width 207 slightly smaller than interior depth 133 of channel 150 of female A-frame member 132, thus permitting male A-frame member 202 to fit "within" female A-frame member 132. When so assembled, tubes 206 of male A-frame member 202 are substantially congruent to corresponding channels 150 of female A-frame member 132. That is, male A-frame 202 can nest within female A-frame member 202 such that each channel 150 substantially overlaps corresponding leg 206. This geometry, in addition to supporting cutting units 108a, also assists in aligning the cutting units to the traction vehicle.

Still referring to FIG. 8, male A-frame assembly 200 additionally comprises three rearwardly and upwardly extending J-shaped members 208 and 210 rigidly attached to male A-frame member 202. Upper J-shaped member 208 is integral (e.g., welded) to the top or "apex" of the male A-frame member 202. Integrally attached to the lowermost end of each tube 206 is a lower J-shaped member 210. In the preferred embodiment, J-shaped members 208 and 210 provide pivotal attachment of male A-frame member 202 to vehicle frame 101 via an upper A-frame pivot joint 212 (located at the top of upper J-shaped member 208) and a lower A-frame pivot joint 214 on each lower J-shaped member 210.

Extending rearwardly from upper pivot 212 is an upper lift link 216. The aft end of link 216 pivotally attaches to vehicle frame 101 at an upper frame pivot joint 218. Pivotally attached to each lower A-frame pivot joint 214 is a lower lift link 220. The aft end of each lower lift link 220 extends rearwardly and attaches to vehicle frame 101 at a lower frame pivot joint 222. Pivot joints 212, 214, 218, and 222 each permit rotation about parallel, transverse horizontal axes. When the implement is in its lowered, working position, links 216 and 220 are substantially horizontal and male A-frame member 202 is in a substantially vertical plane, as shown in FIG. 8. Since the geometry of lift links 216, 220 generally forms a parallelogram, male A-frame member 202 remains substantially vertically oriented even as the implement is moved to its transport position (shown in phantom in FIG. 9).

Interposed between vehicle frame 101 and male A-frame 202 is a lift cylinder 224. While it is depicted as a dual-acting, hydraulic cylinder, those skilled in the art will recognize that any linear actuator (e.g. pneumatic cylinder, electric ball screw) will suffice. Referring to FIG. 8, the base end of cylinder 224 is pivotally attached to vehicle frame 101 at a base pivot (not shown) and the rod end of cylinder 224 is pivotally attached to male A-frame member 202 at upper A-frame pivot joint 212. A series of flexible hydraulic lines (not shown) connect cylinder 224 to a hydraulic pump (also not shown). By operator manipulation of a control lever connected to a hydraulic valve (not shown), cylinder 224 may be commanded to extend upwardly or retract downwardly. Extension/retraction of cylinder 224 results in vertical displacement of male A-frame member 202. In the preferred embodiment, the transport position corresponds to maximum extension of cylinder 224 while the working position corresponds to minimum cylinder extension. The preferred cylinder has a bore diameter of 60 mm (2.36 in) and a stroke of 140 mm (5.51 in). However, other cylinder sizes may be necessary to accommodate variations in geometry and weight.

Although not integral to male A-frame assembly 200, the stationary rollers will now be discussed. Referring generally to FIGS. 2, 7 and 8, a pair of stationary rollers 227 extend forwardly from the lower center of vehicle frame 101 in a direction substantially parallel to the longitudinal axis of the vehicle. In the preferred embodiment, each roller 227 is constructed of hardened steel and is approximately 3 inches in diameter. Each roller is rotatably attached to the fixed portion of vehicle frame 101 and does not move with male A-frame member 202. In the preferred embodiment, each roller 227 is located slightly above its associated kicker roller 144 when female A-frame assembly 130 is attached and in the working position. The function of stationary rollers 227 and kicker rollers 144 is described below.

DRIVE SYSTEM

Figure 5:
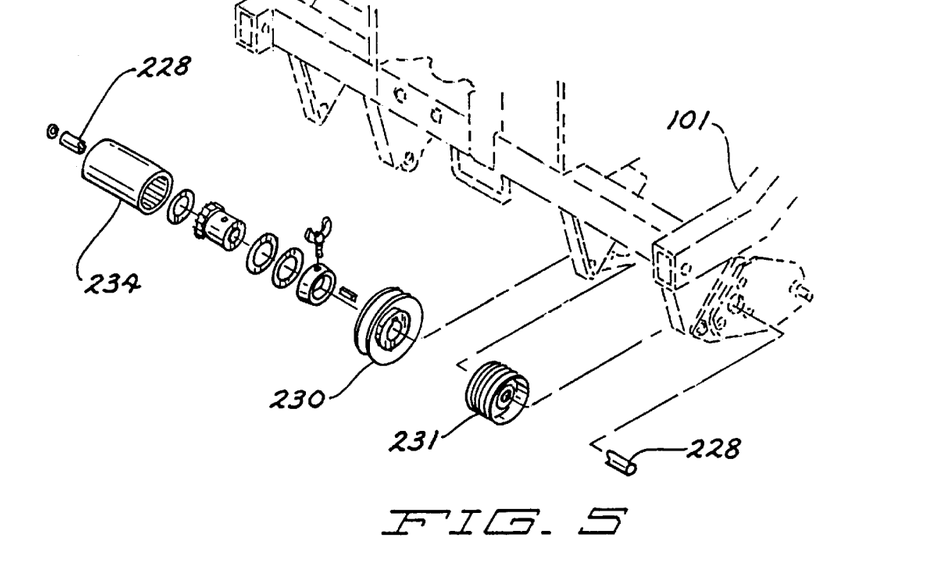
FIG. 5 is an exploded view of a portion of the implement drive system, in particular the left half-shaft assembly.
Figure 6:
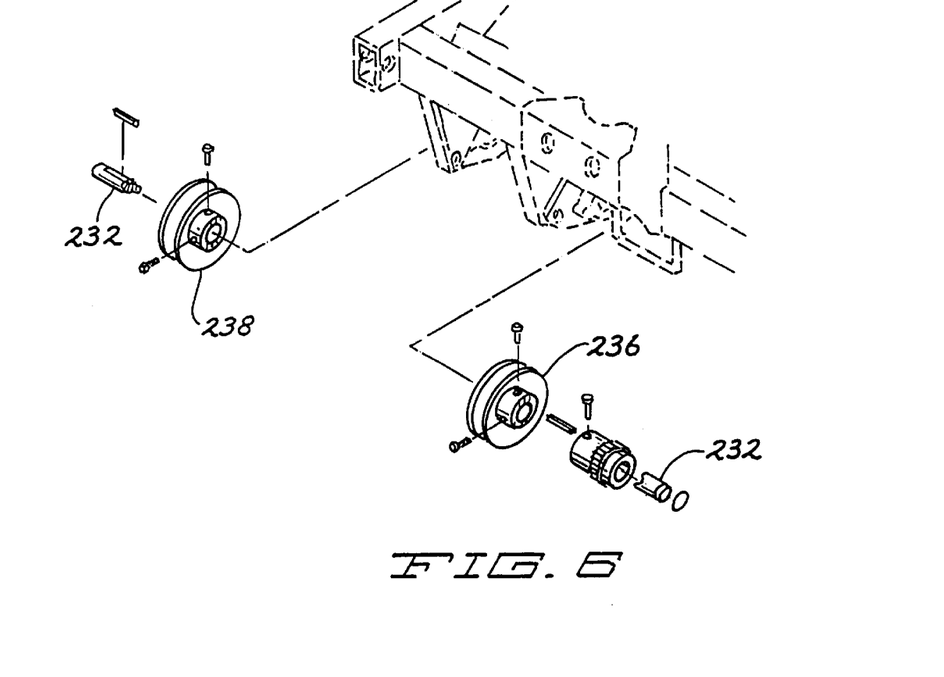
FIG. 6 is an exploded view of another portion of the implement drive system, the right half-shaft assembly.

Directing the reader's attention to FIGS. 5 and 6, the cutting unit drive system will now be described. The prime mover preferably provides power to cutting units 108 through a belt drive. In the preferred embodiment, the prime mover operatively powers a left half-shaft 228 under operator command. Left half-shaft 228 receives power from the prime mover through a main pulley 231. A first drive pulley 230 is affixed proximal to the inboard end of left half-shaft 228. Mounted opposite to left half-shaft 228 is a right half-shaft 232. A splined coupler 234 may be manually engaged between half-shafts 228 and 232 to provide rotational power to the latter. Operatively connected to right half-shaft 232 is a second drive pulley 236 and a third or rear drive pulley 238. During operation, first and second drive pulleys 230 and 236 provide rotational power to the front left and right cutting units respectively via a pair of drive belts 229 (best viewed in FIG. 9) while rear drive pulley 238 provides power to rear cutting unit 108b via a rear drive belt (not shown). Only when coupler 234 is engaged do second drive pulley 236 and third drive pulley 238 receive power.

Figure 9:
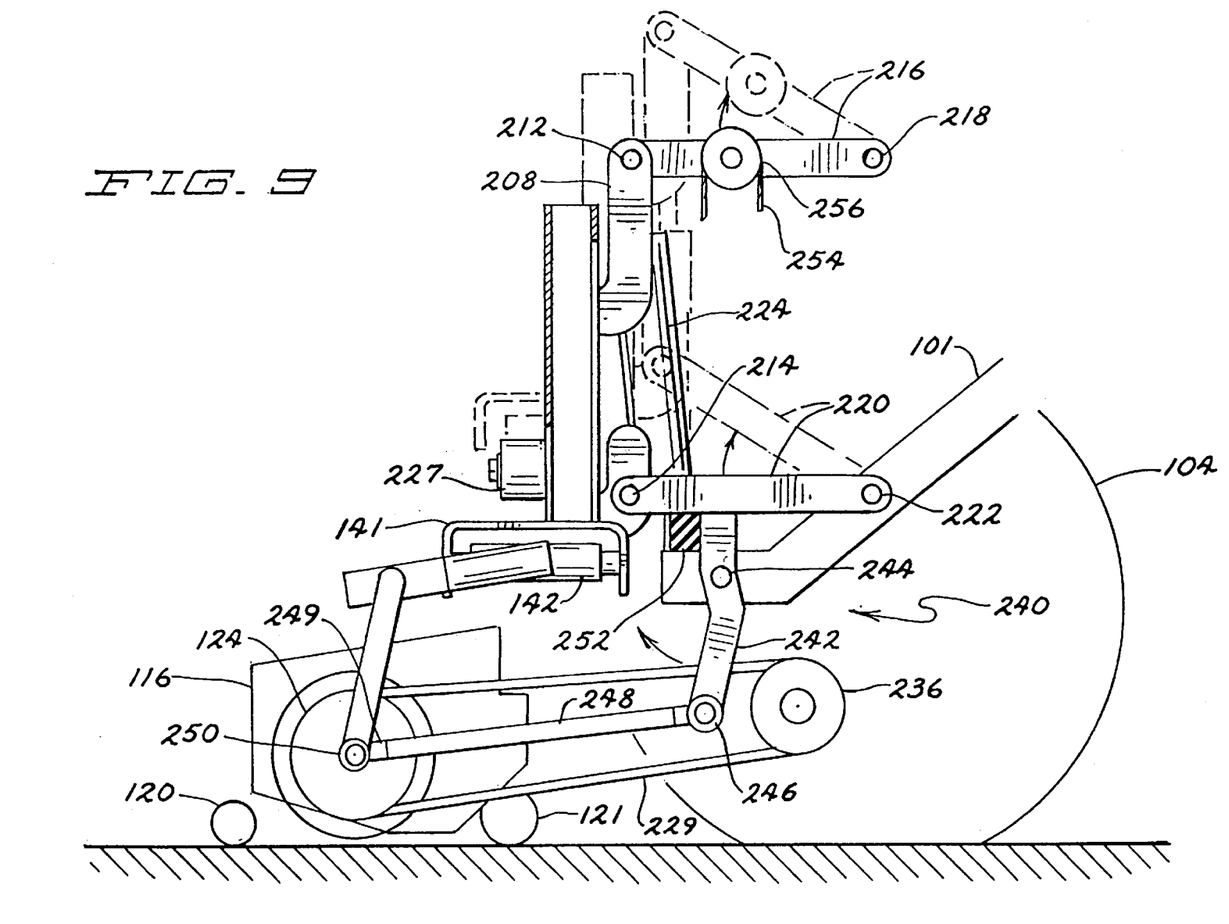
FIG. 9 is a side elevational view of the attachment system of FIG. 1 with the left cutting unit removed and showing the belt tensioning mechanism with the cutting unit attached.
Figure 10:
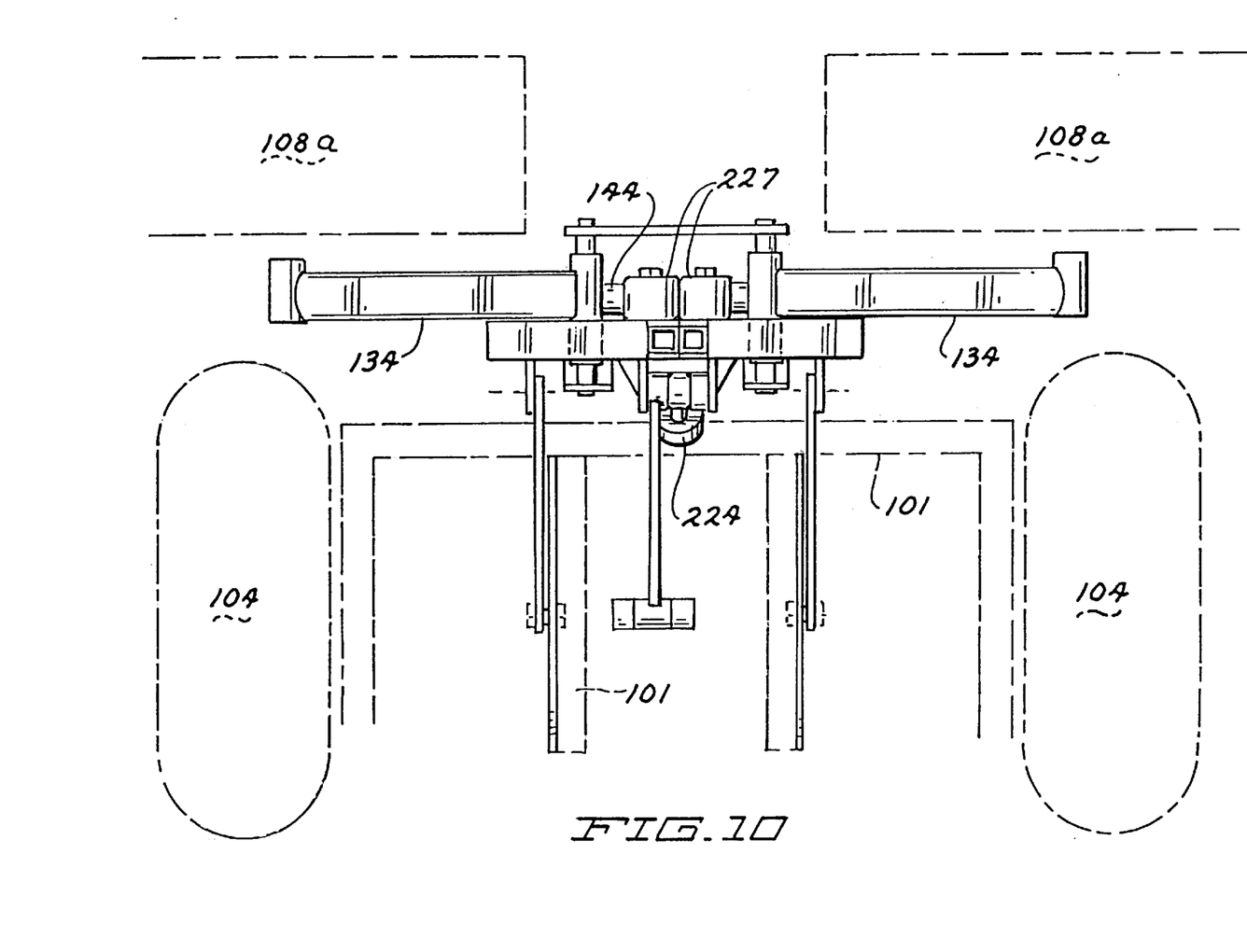
FIG. 10 is a top plan view of the attachment system of FIG. 1.

The drive system also includes a belt tensioning assembly 240 (one per front cutting unit) best shown in FIG. 9. Belt tensioning assembly 240 is designed to provide the correct belt tension when cutting unit 108a is in the operating position, yet not interfere with the movement of the cutting unit as it is moved to the transport position. In the preferred embodiment, the belt tensioning assembly comprises several components. A tension arm 242 is pivotally connected to frame 101 at a frame pivot 244. Pivot 244 preferably permits pivotal motion about a horizontal transverse axis such that tension arm 242 remains in a substantially vertical plane. At its lower end, tension arm 242 includes a lower pivot joint 246. Operatively connected to pivot joint 246 and extending forwardly therefrom is a tie rod 248. At its forward end, tie rod 248 connects to the inboard face of side plate 116 at a pivot joint 250. Preferably, tie rod 248 has, at each end, a spherical bearing 249 which permits not only pivotal motion but motion out-of-plane as well. In the preferred embodiment, spherical rod ends 249 are threaded to tie rod 248 and secured with a jam nut (not shown). Thus, the overall length of tie rod 248 is adjustable.

At its upper end, tension arm 242 is biased clockwise (as viewed in FIG. 9) by a rubber bumper 252 which is braced against frame 101. This biasing action causes the lower end of tension arm 242, and thus tie rod 248, to apply a forward force to cutting unit 108a. Thus, when cutting units 108a are in the operating position, optimal drive belt tension is provided.

OPERATION

Having described the various items that comprise the preferred operating unit attachment system, attention will now be directed to the operation of mower 100. In the preferred embodiment, attachment of female A-frame assembly 130 to the traction vehicle is accomplished by first fully retracting lift cylinder 224, thus placing male A-frame member 202 in its lowermost position as shown in FIGS. 2 and 8. The traction vehicle may then be maneuvered so that the apex of male A-frame member 202 is generally beneath the apex of female A-frame member 130. By manipulation of a lever (not shown), the operator may hydraulically actuate lift cylinder 224 to a slightly extended position. This forces male A-frame member 202 to rise and engage female A-frame member 130 as shown in FIG. 9. Due to the common angular configuration of C-shaped channels 150 and tubes 206, engagement of the A-frame members will automatically center female A-frame assembly 130 as it is raised. This feature is particularly beneficial when the male and female A-frame members are slightly offset in the lateral direction prior to extension of cylinder 224. Upon complete engagement, a locking pin 152 best viewed in FIG. 2, is inserted through both A-frame members to prevent relative motion therebetween. Once the A-frame members are secured, drive belts 229 (which remain with the cutting units when removed) are attached to drive pulleys 230 and 236. The drive pulleys are accessible for belt mounting when splined coupler 234 is disengaged, thus exposing the inboard ends of each half-shaft 228 and 232. Once the belts are installed, splined coupler 234 can be engaged between the separate half-shafts, permitting power transmission to second and third drive pulleys 236 and 238.

Tie rod 248 may then be attached to tension arm 242 at tension arm/rod pivot joint 246. As previously described, since rod ends 249 are in threaded engagement with tie rod 248, altering the amount of thread engagement between rod ends 249 and tie rod 248 will change the effective length of the tie rod. When cutting units 108a are installed and in the working position, rubber bumper 252 rearwardly biases the upper end of tension arm 242, resulting in a constant forward force on tie rod 248. The drive belts are thereby tensioned sufficiently to permit efficient transmission of rotary power from drive pulleys 230, 236 to driven pulleys 124. While Applicants have selected rubber bumper 252, alternative ways to apply a forward-acting force (for example, a conventional compression spring) to cutting unit 108a also fall within the scope of this invention.

The belt tensioning assembly (tie rod 248, rod ends 249, tension arm 242, and rubber bumper 252) is designed to provide the correct belt tension when cutting unit 108a is in the operating position yet not interfere with the movement of the cutting unit as it is moved to the transport position. This is accomplished by permitting tie rod 248 to move freely in the forward direction, a result of tension arm 242 pivoting freely in the clockwise direction (as viewed in FIG. 9) about tension arm pivot joint 244. Additionally, rod ends 249 permit tie rod 248 to translate out-of-plane. Thus, when the cutting unit 108a is moved to the transport position, tie rod 248 will assume a skewed position as shown in FIG. 7. This range of freedom provides optimal belt tension in the operating position without unduly restricting the motion of cutting unit 108a as it is raised.

Referring now to FIG. 7, during operation, cutting unit 108a is in the lower or working position and lift cylinder 224 is in the retracted or "down" position. In this configuration, the A-frame members are in their lowermost position, permitting full engagement of cutting unit 108a with the ground. As the cutting unit traverses undulations in the ground, pivot joint 140 permits the cutting unit to pivot about an intermediate horizontal axis to maintain optimal ground contact. When the vehicle traverses more gently sloping terrain, pivot joint 142 permits the entire cutting unit to pivot about a horizontal or "wing" axis located more central to the traction vehicle. Thus, cutting unit 108a maintains optimal ground contact regardless of turf undulations. Irrespective of cutting unit movement though, the A-frame members remain stationary relative to the traction vehicle during operation.

When the cutting operation is complete, the operator, through manipulation of a control handle (not shown), may selectively disengage the belt drive system to prevent the rotation of cutting reel 122. By selectively commanding the cutting units 108a to the transport position, lift cylinder 224 extends, forcing male A-frame member 202 to rise. In the preferred embodiment, if the operator fails to manually disengage the belt drive system prior to raising the cutting units, an interlock will disengage the system automatically. Stated alternatively, cutting units 108 may receive power only when in the operating position.

As shown in FIG. 7, when male A-frame member 202 is raised, female A-frame member 132 and attached lift arms 134 also rise due to the interconnection of the A-frame members. As the lift arms rise, each kicker roller 144 eventually contacts the lowermost portion of the corresponding stationary roller 227. As the lift arms 134 continue to rise, each kicker roller 144 is prohibited from further vertical motion by interaction with stationary roller 227. This interaction forces lift arm 134 to pivot about joint 142. When cutting unit 108a has reached its raised or transport position, pivot joint 142 has risen above stationary roller 227 while kicker roller 144 has been restricted as described. The resulting geometry of the lift arm/cutting unit is shown in FIG. 7.

As the cutting units are repositioned between the working and transport positions, the distance between drive pulleys 230, 236 and driven pulleys 124 changes accordingly. To prevent over-stressing of drive belt 229 as each cutting unit 108a is raised, tension arm 242 pivots clockwise (as viewed in FIG. 9) about tension arm pivot joint 244 and allows forward motion of tie rod 248. When cutting unit 108a begins to pivot due to contact between kicker roller 144 and stationary roller 227, spherical rod ends 249 permit tie rod 248 to translate out-of-plane. Thus, tie rod 248 does not constrain the motion of cutting unit 108a as it is repositioned.

However, as the cutting unit is further raised, drive belt 229 eventually begins to tighten. If the belt tension becomes too great, cutting unit motion can be restricted. Thus, inboard pivot joint 142 is designed to permit lift arm 134 to slide rearwardly as the cutting unit is raised. That is, as the cutting unit 108a is raised from the working to the transport position, lift arm 134 is free to slide rearwardly along pivot 142 to the extent gap 149 permits. By sizing gap 149 correctly, adequate rearward movement of cutting unit 108a and lift arm 134 is provided to prevent over-extension of drive belt 229. Gap 149, however, is not so large that excessive belt slack develops.

While the preferred embodiment may utilize hydraulic pressure within cylinder 224 to maintain the cutting units in their transport position, a transport latch (not shown) may be used to lock the outboard ends of cutting units 108a in their raised position. The use of the transport latch ensures that the cutting units remain in the desired raised position even when hydraulic pressure is removed (i.e., mower is turned off).

Upon reaching a new site, the operator may remove the transport latch (if installed) and command cutting units 108 to their down or working position. In the preferred embodiment, actuator 224 is hydraulically retracted. However, other embodiments utilizing gravity retract (i.e., single-acting cylinder) are also possible within the scope of this invention. Due to the configuration of the belt tensioning assembly, no additional operator interaction is necessary prior to engaging the cutting units 108a.

Referring now to FIG. 9, rear cutting unit 108b is operatively connected to cylinder 224 by a cable 254 and a series of pulleys 256. When actuator 224 is raised, cable 254 causes rear cutting unit 108b to move to its transport position. Like front cutting units 108a, a transport latch (not shown) may be used to lock cutting unit 108b in its transport position if desired.

In order to disengage female A-frame assembly 130 from the traction vehicle, it is first necessary to lower cutting units 108a to the working position. The operator must then remove tie rod 248 from tension arm 242 at pivot 246. Splined coupler 234 may then be retracted onto left half-shaft 228, thereby exposing the inboard end of both left and right half-shafts 228 and 232. With tie rods 248 disconnected, sufficient slack in drive belts 229 exists to permit removal of the belts from drive pulleys 230 and 236. Finally, locking pin 152 may be removed from the A-frame members. The vehicle may then be "backed away" from the female A-frame assembly 130 and, in this case, cutting units 108a.

Figure 11:
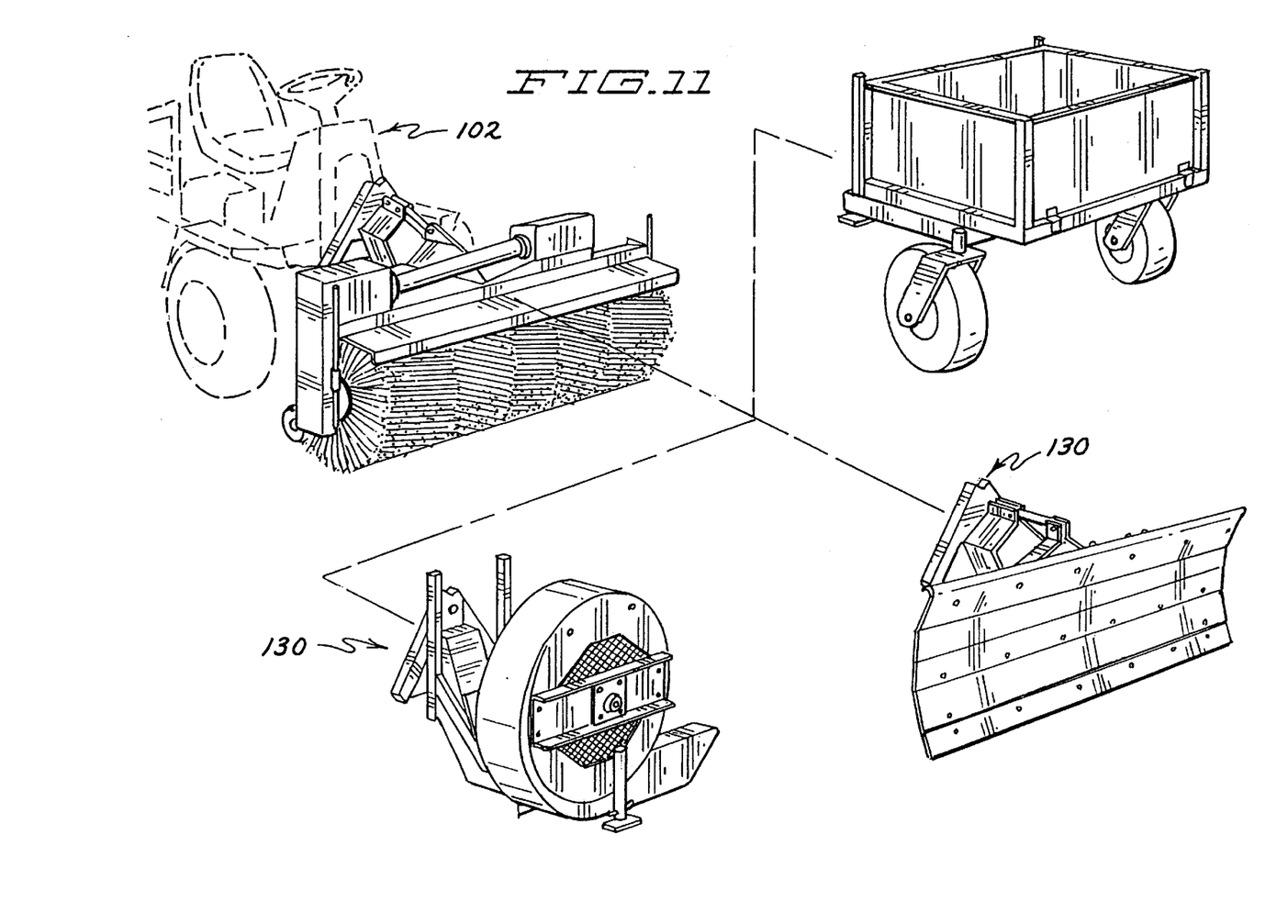
FIG. 11 is a perspective view of a preferred multi-purpose turf maintenance vehicle with alternative attachments.

Installation of other implements or "operating units" (e.g., snow thrower, dozer blade) requires a procedure quite similar to that required of the cutting units. As shown in FIG. 11, each implement has an identical female A-frame member 202. However, unlike cutting units 108a, these other implements may not have a component like kicker roller 144. If so, no wing motion occurs as the implement is raised. That is, the implement is displaced in the vertical direction only. Thus, by including or excluding a component like kicker roller 144 from a particular operating unit, lift cylinder 224 can provide both vertical lifting and, if desired, "wing-like" pivoting of the operating unit.

By isolating the second and third drive pulleys 236 and 238 (i.e., disengaging splined coupler 234), first drive pulley 230 may be used to power alternative implements without unnecessarily powering right half-shaft 232. Thus, rear cutting unit 108b is operatively disconnected from the prime mover whenever other implements are installed. While this permits the efficient use of belt-driven attachments, the vehicle of the preferred embodiment also provides additional drive methods for maximum versatility. Specifically, a PTO shaft as well as conventional hydraulic connections are provided. This provides the mower of the present invention with considerable flexibility regarding the implements it may accommodate.

Preferred embodiments of the invention are described above. Those skilled in the art will recognize that other embodiments are possible within the scope of the invention. Variations and modifications of the various parts and assemblies can certainly be made and still fall within the scope of the invention. Thus, the invention is limited only to the apparatus and method recited in the following claims, and equivalents thereto.

We claim:

1. For use with a traction vehicle and an operating unit, a system for operatively connecting the operating unit to the traction vehicle and for moving the operating unit from a working position to a transport position relative to the traction vehicle, the system comprising:

a) a male member;
b) a female member substantially congruent to the male member, wherein the male member interlocks with the female member, thereby interconnecting the operating unit to the traction vehicle;
c) means for vertically raising the interconnected members and the operating unit; and
d) means for pivoting the operating unit relative to the traction vehicle about a longitudinal axis substantially parallel to a longitudinal axis of the vehicle to provide lateral wing-type folding of the operating unit relative to the traction vehicle as the operating unit is raised from its working position to its transport position.

2. For use with a traction vehicle and an operating unit, a system for operatively connecting the operating unit to the traction vehicle and for moving the operating unit from a working position to a transport position relative to the traction vehicle, the system comprising:
a) an upwardly converging male member operatively connected to the traction vehicle;
b) an upwardly converging female member operatively connected to the operating unit and substantially congruent to the male member, wherein the male member interlocks with the female member, thereby interconnecting the operating unit to the traction vehicle;
c) means for vertically raising the interconnected members and the operating unit; and
d) means for pivoting the operating unit relative to the traction vehicle about a longitudinal axis substantially parallel to a longitudinal axis of the vehicle to provide lateral wing-type folding of the operating unit relative to the traction vehicle as the operating unit is raised from its working position to its transport position.

3. For use with a traction vehicle and an operating unit, a system for operatively connecting the operating unit to the traction vehicle and for moving the operating unit from a working position to a transport position relative to the traction vehicle, the system comprising:
a) a male member operatively connected to the traction vehicle;
b) a female member operatively connected to the operating unit, wherein the male member interlocks with the female member to interconnect the operating unit to the traction vehicle;
c) a first device for vertically raising the interconnected male and female members and the operating unit; and
d) a second device for pivoting the operating unit relative to the traction vehicle about a longitudinal axis substantially parallel to a longitudinal axis of the vehicle to provide lateral wing-type folding of the operating unit relative to the traction vehicle as the operating unit is raised, comprising:
   i) a first contact member operatively connected to the operating unit; and
   ii) a second contact member operatively connected to the traction vehicle, whereby interaction between the first and second contact members causes the operating unit to simultaneously pivot as it is raised from its working position to its transport position.

4. A system for attaching an operating unit to a traction vehicle, the traction vehicle having a prime mover powering at least one auxiliary drive pulley, wherein the drive pulley is operatively connected to the operating unit by a drive belt, the system comprising:
a) a male A-frame member operatively connected to the traction vehicle;
b) a female A-frame member operatively connected to the operating unit, wherein the male A-frame member engages the female A-frame member to interconnect the operating unit to the traction vehicle;
c) a first device for positioning the operating unit in either a working position or a transport position;
d) at least one driven pulley operatively connected to the operating unit to receive power from the drive belt; and
e) a second device for providing proper belt tension between the drive pulley and the driven pulley when the operating unit is in the working position, wherein the second device comprises:
   i) a tension arm pivotally connected to the traction vehicle;
   ii) an adjustable tie rod having a forward end operatively connected to the operating unit and a rearward end operatively connected to the tension arm; and
   iii) a biasing member attached to the traction vehicle and acting against the tension arm to forwardly bias the tie rod when the operating unit is in the working position such that proper belt tension is applied when the operating unit is in the working position.

5. A system for attaching an operating unit to a traction vehicle, the traction vehicle having a prime mover powering at least one auxiliary drive pulley, wherein the drive pulley is operatively connected to the operating unit by a drive belt, the system comprising:
a) a male A-frame member operatively connected to the traction vehicle;
b) a female A-frame member operatively connected to the operating unit, wherein the male A-frame member slidably engages the female A-frame member to interconnect the operating unit to the traction vehicle;
c) means for positioning the operating unit in either a working position or a transport position;
d) at least one driven pulley operatively connected to the operating unit to receive power from the drive belt;
e) means for providing proper belt tension between the drive pulley and the driven pulley when the operating unit is in the working position; and
f) wherein the operating unit comprises:
   i) at least one reel cutting unit; and
   ii) a lift arm having an outboard end pivotally attached to the cutting unit at an outer pivot, an inboard end, and a center pivot located between the inboard and outboard ends proximal to the inboard end, the center pivot providing pivotal attachment of the lift arm to the female A-frame member.

6. The system of claim 5, wherein a kicker roller is mounted on the inboard end of the lift arm.

7. The system of claim 6, wherein the positioning means comprises:
a) a hydraulic cylinder having a first end pivotally attached to the traction vehicle and a second end pivotally attached to the male A-frame member, wherein the cylinder downwardly displaces the interconnected A-frame members when the cutting unit is in the working position and upwardly displaces the A-frame members when the cutting unit is in the transport position; and
b) at least one stationary roller attached to the traction vehicle, such that as the A-frame members are upwardly displaced, the stationary roller interacts with the kicker roller, whereby the lift arm and cutting unit are pivoted about the center pivot.

8. The system of claim 7, wherein the belt tensioning means comprises:
   a) a tension arm pivotally connected to the traction vehicle;
   b) an adjustable tie rod having a forward end operatively connected to the cutting unit and a rearward end operatively connected to the tension arm; and
   c) a rubber bumper attached to the traction vehicle frame, whereby the rubber bumper forwardly biases the tie rod when the cutting unit is in the working position such that proper belt tension is applied when the cutting unit is in the working position.

9. The system of claim 8, wherein the adjustable tie rod additionally comprises a spherical rod end at both the forward end and the rearward end.

10. The system of claim 9, wherein the lift arm slidably communicates with the center pivot such that the lift arm and cutting unit can slide rearwardly along the center pivot as the cutting unit is raised from the working position to the transport position.

11. A power turf mower having a prime mover powering at least one auxiliary drive pulley, wherein the drive pulley powers at least one drive belt, the mower comprising:
   a) a traction vehicle;
   b) a device for grooming turf; and
   c) a system for operatively attaching the turf grooming device to the traction vehicle, wherein the system comprises (i) a male A-frame member operatively connected to the traction vehicle; (ii) a female A-frame member operatively connected to the turf grooming device, wherein the male A-frame member engages the female A-frame member to interconnect the turf grooming device to the traction vehicle; (iii) an actuator for positioning the turf grooming device in either a working position or a transport position; (iv) at least one driven pulley operatively connected to the turf grooming device to receive power from the drive belt; and (v) a second device for providing proper belt tension between the drive pulley and the driven pulley when the turf grooming device is in the working position.

12. For use with a traction vehicle and an operating unit, a system for operatively connecting the operating unit to the traction vehicle and for moving the operating unit from a working position to a transport position relative to the traction vehicle, the system comprising:
   a) at least one frame member operatively connected to the traction vehicle for vertical movement;
   b) a lift arm operatively connected to the operating unit for carrying the operating unit, the lift arm having a first pivotal connection to the at least one frame member for pivotal, wing-type folding of the operating member about a longitudinal lift arm axis that is substantially parallel to a longitudinal axis of the traction vehicle;
   c) a powered actuator for vertically moving the at least one frame member relative to the traction vehicle to thereby vertically move the lift arm and the operating unit carried thereon between a lowered working position and a raised transport position; and
   d) a vertically fixed contact member carried on the traction vehicle and positioned to have an abutting engagement with the lift arm during vertical upward motion of the lift arm as the operating unit moves upwardly from its lowered working position towards its raised transport position, the abutting engagement between the stationary contact member and the lift arm being so located as to pivot the lift arm about the longitudinal lift arm axis such that the pivotal, wing type folding of the operating unit is automatically provided by the abutting engagement of the stationary contact member and the lift arm when the at least one frame member is moved vertically upwardly by the powered actuator.

13. The system of claim 12, wherein the powered actuator is a linear actuator.

14. The system of claim 13, wherein the linear actuator is a hydraulic cylinder.

15. The system of claims 12, wherein the vertically fixed contact member is a rotatable roller carried on the traction vehicle in a vertically fixed position.

16. The system of claim 15, further including a rotatable roller carried on the lift arm and vertically movable with the lift arm as the at least one frame member moves vertically upwardly, wherein the rotatable roller carried on the lift arm has the abutting engagement with the rotatable roller carried on the traction vehicle at some point during vertically upward motion of the lift arm and the operating unit carried thereon.

17. The system of claim 16, wherein the rotatable roller carried on the lift arm is located on one end of the lift arm, and the operating unit is carried on the other end of the lift arm.

18. The system of claim 17, wherein the operating unit is carried on the other end of the lift arm by a second pivotal connection that is substantially parallel to the longitudinal axis of the traction vehicle to permit the cutting unit to tilt or rock relative to the lift arm as the lift arm also tilts or rocks relative to the at least one frame member about the first pivotal connection when the operating unit is in its lowered working position, thereby to allow the operating unit to follow changes in ground contour.

19. The system of claim 18, wherein the second pivotal connection of the operating unit to the lift arm is substantially parallel to, but spaced from, the first pivotal connection of the lift arm to the at least one frame member.

20. The system of claim 19, wherein the first pivotal connection of the lift arm to the at least one frame member is located on the lift arm between the rotatable roller carried on the one end of the lift arm and the second pivotal connection of the operating unit to the lift arm carried on the other end of the lift arm.

21. The system of claim 12, wherein the at least one frame member comprises first and second interlocking frame members, the first interlocking frame member being vertically movable relative to the traction vehicle and the second interlocking frame member carrying the lift arm and the operating unit.

22. The system of claim 21, wherein the first interlocking frame member is a male frame member and the second interlocking frame member is a female frame member that is substantially congruent in shape to the male member to allow the male and female frame members to nest and interlock with one another.

23. The system of claim 22, wherein the male and female frame members are A-shaped.

24. For use with a traction vehicle and an operating unit, a system for operatively connecting the operating unit to the traction vehicle and for moving the operating unit from a working position to a transport position relative to the traction vehicle, the system comprising:
   a) at least one frame member operatively connected to the traction vehicle for vertical movement;

b) a lift arm operatively connected to the operating unit for carrying the operating unit, the lift arm having a first pivotal connection to the at least one frame member for pivotal, wing-type folding of the operating member about a longitudinal lift arm axis that is substantially parallel to a longitudinal axis of the traction vehicle;

c) a powered actuator for vertically moving the at least one frame member relative to the traction vehicle to thereby vertically move the lift arm and the operating unit carried thereon between a lowered working position and a raised transport position; and d) a system to pivot the lift arm about the longitudinal lift arm axis to provide the pivotal, wing type folding of the operating unit when the at least one frame member is moved vertically upwardly by the powered actuator;

e) at least one driven pulley operatively connected to the operating unit to receive power from a drive pulley on the traction vehicle; and f) a system for providing proper belt tension between the drive pulley and the driven pulley when the operating unit is in the working position, the system including a forwardly biased tie rod acting between the traction vehicle and the driven pulley to force the driven pulley forwardly to maintain belt tension, the tie rod having spherical rod ends at each end to allow the tie rod to change planes relative to the operating unit as the operating unit experiences the pivotal, wing-type folding motion.

25. The system of claim 24, wherein the lift arm slidably communicates with the first pivotal connection such that the lift arm and operating unit can slide rearwardly along the first pivotal connection as the operating unit is raised from the working position to the transport position.

* * * * *